US007016475B2

(12) United States Patent
Resuta (10) Patent No.: US 7,016,475 B2
(45) Date of Patent: Mar. 21, 2006

(54) EXTENDABLE CALL AGENTS SIMULATOR

(75) Inventor: David P. Resuta, Chalfont, PA (US)

(73) Assignee: General Instrument Corporation, Horsham, PA (US)

(*) Notice: Subject to any disclaimer, the term of this patent is extended or adjusted under 35 U.S.C. 154(b) by 199 days.

(21) Appl. No.: 10/615,151

(22) Filed: Jul. 8, 2003

(65) Prior Publication Data

US 2004/0008824 A1 Jan. 15, 2004

Related U.S. Application Data

(63) Continuation of application No. 09/852,418, filed on May 10, 2001, now abandoned.

(51) Int. Cl.
H04M 1/24 (2006.01)
H04M 3/08 (2006.01)
H04M 3/22 (2006.01)
H04L 1/00 (2006.01)

(52) U.S. Cl. ............... 379/29.02; 379/1.01; 379/15.01; 379/27.02; 370/241; 370/241.1; 370/252; 370/495

(58) Field of Classification Search ........... 370/241, 370/241.1, 242, 244, 252, 352, 494, 495; 379/1.01, 9.02, 15.01, 15.03, 26.01, 27.02, 379/27.04, 29.01, 29.02, 31; 324/527, 537, 324/76.11; 714/25, 26, 28, 32
See application file for complete search history.

(56) References Cited

U.S. PATENT DOCUMENTS

| 5,982,852 | A | 11/1999 | Schwartz |
| 6,081,509 | A | 6/2000 | Magiros |
| 6,205,412 | B1 | 3/2001 | Barskiy |
| 6,292,909 | B1 | 9/2001 | Hare |
| 6,351,455 | B1 | 2/2002 | Thayer et al. |
| 6,654,914 | B1 * | 11/2003 | Kaffine et al. ............. 714/43 |
| 6,842,427 | B1 * | 1/2005 | Evslin et al. ............. 370/252 |
| 2002/0015387 | A1 * | 2/2002 | Houh ..................... 370/250 |

* cited by examiner

Primary Examiner—Quoc Tran
(74) Attorney, Agent, or Firm—Lawrence T. Cullen (57) ABSTRACT

A method and associated apparatus for testing telephone system operation. The method comprising connecting a call agent simulator to a network. Call actions or events are applied from the call agent simulator to the network expected to produce expected results in the network. The telephone system operation is verified by comparing the actual results produced to the expected results. In another aspect, an IP network or a consumer premises equipment is verified using the call agent simulator. In another aspect, the telephone system is a Voice over Internet (VoIP) system.

14 Claims, 4 Drawing Sheets

FIG. 4

EXTENDABLE CALL AGENTS SIMULATOR

FIELD OF THE INVENTION

This invention relates to voice over Internet (VOIP) telephone equipment, and more particularly to call agents associated with that VOIP telephone equipment.

BACKGROUND OF THE INVENTION

Plain Old Telephone Systems (POTS) represent the traditional type of analog phone service. A variety of digital telephony services have been developed since POTS. One such service is Voice over Internet (VoIP) that transmits voice communications at least partially over the Internet. VoIP has considerable advantages over POTS systems, largely due to the digital nature of the signal processing and the reduced expense associated with Internet compared to phone usage. These advantages include reduced operating cost and increased signal processing capability such as is beneficial for call set up, call maintenance, signal encryption, and operating functionality, and enhanced signal encryption and signal processing techniques that result from the digital nature of the VoIP communications.

VoIP systems provide communications between a plurality of communications gateways (CG). Call agents are resident on the Internet and are assigned the complex task of controlling VoIP call set up, call maintenance, and call tear down. Call agents manage the calls and provide billing and other such tasks associated with the call. Setting up, maintaining, and breaking down VoIP systems require considerable call agent involvement. For example, a full-time computer professional may be required to operate and manage the call agent.

Extending the functionality of CGs to provide extended service to existing customers, or providing new services to new customers, typically requires that the call agent be compiled, linked, and loaded, which requires considerable call agent processing time. Additionally, testing the operation and components (such as CG) within the networks requires highly specialized equipment.

Call agent simulators can be used to test network operation or components. Present call agent simulators are designed with similar computer languages to perform similar operations and/or routines as do call agents. For example, to verify or test the operation of a network or network component, certain complex call agent simulators have to perform similar compiling and linking the call agent itself. These compiling and linking operations require considerable processing time.

It would therefore be desirable to provide a call agent simulator that could validate or test the telephone network, network components, or call agent but yet require only simplified computer programming techniques that do not require compiling or linking. It would also be desirable to reduce the time to accurately validate or test call agent, network or network component using a call agent simulator.

SUMMARY OF THE INVENTION

The present invention is directed to a method and associated apparatus for providing call agent simulation for testing or verifying telephone system operation. The method comprising connecting a call agent simulator to a network. Call actions or events are applied from the call agent simulator to the network and which are anticipated to produce expected results in the network. The call agent simulator operation is verified by comparing the actual results produced to the expected results. In different aspects, an IP network or a network component such as a consumer premises equipment is verified using the call agent simulator

BRIEF DESCRIPTION OF THE DRAWINGS

The accompanying drawings, which are incorporated herein and constitute part of this specification, illustrate the presently preferred embodiment of the invention, and, together with the general description given above and the detailed description given below, serve to explain features of the invention.

DETAILED DESCRIPTION OF THE EMBODIMENT

This disclosure relates to the structure and operation of one embodiment of call agent simulator 160. The call agent simulator 160 may be integrated into a digital telephony system to simulate events initiated by a subscriber telephone to that digital telephony system, or alternatively to test or validate the operation of a network or network components to prescribed events produced by the call agent simulator. This disclosure describes the structure and operation of a digital telephony system such as a Voice over Internet (VoIP) system 100. The interaction between the call agent simulator 160 and the digital telephony system is then described.

Figure 1:
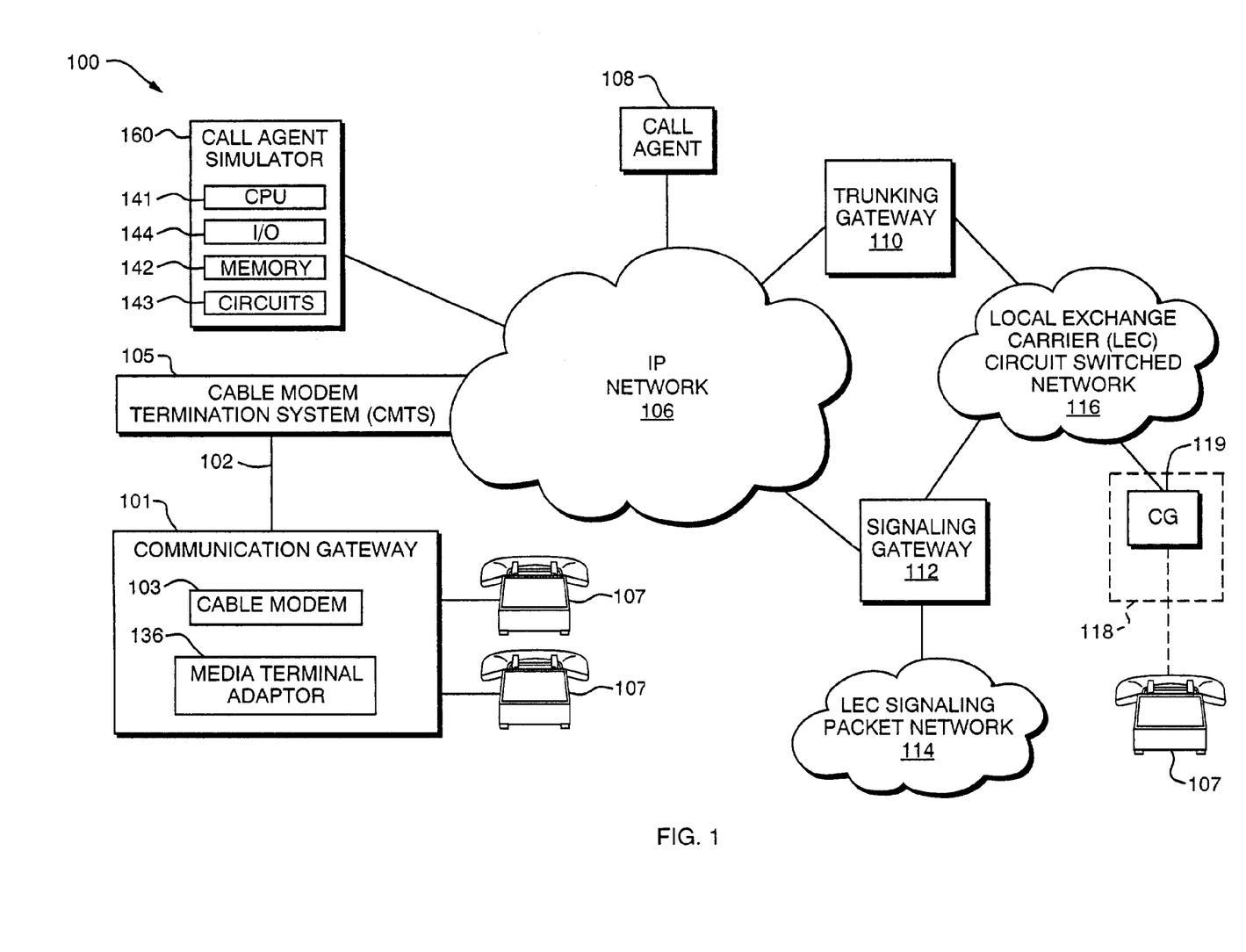
FIG. 1 is a block diagram of one embodiment of a VoIP system including a call agent or call agent simulator.

FIG. 1 shows one embodiment of digital telephony system, in this instance known as the VoIP system 100. The VoIP system 100 provides for voice communication between a plurality of communication gateways (CG) 101 over an Internet (IP) network 106 and a hyper fiber coax network (HFC) 102. Alternatively, the VoIP system 100 provides for voice communication between subscriber telephones 107 respectively located at a CG 101 and a CG remote 118 over the IP network 106, the HFC 102, and a local exchange carrier (LEC) circuit switched network 116. The CG 101, also known as a broadband telephony interface (BTI), is configured to include, e.g., a cable modem 103 and a subscriber telephone 107, or any other communication device that allows for subscriber telephone 107 to communicate over the IP network 106. A HFC 102 is configured to provide optic-based cable communications between the local CG 101 and a cable modem termination system (CMTS) 105.

The embodiment of VoIP system 100 shown in FIG. 1 includes the CG 101 (that includes the cable modem 103), the HFC 102, the CMTS 105, the IP network 106, one or more subscriber telephones 107, a call agent 108, a trunking gateway 110, a signaling gateway 112, a local exchange carrier (LEC) signaling packet network 114, a LEC circuit switched network 116, a remote CG 118, and a plurality of subscriber telephones 107 coupled to the CG 118, and the call agent simulator 160. The CG 118 may include, e.g., a cable modem. The VoIP system 100 provides communication using the IP network 106 between subscriber telephones 107 connected to the CG 101 and/or the remote CG 118.

Figure 2:
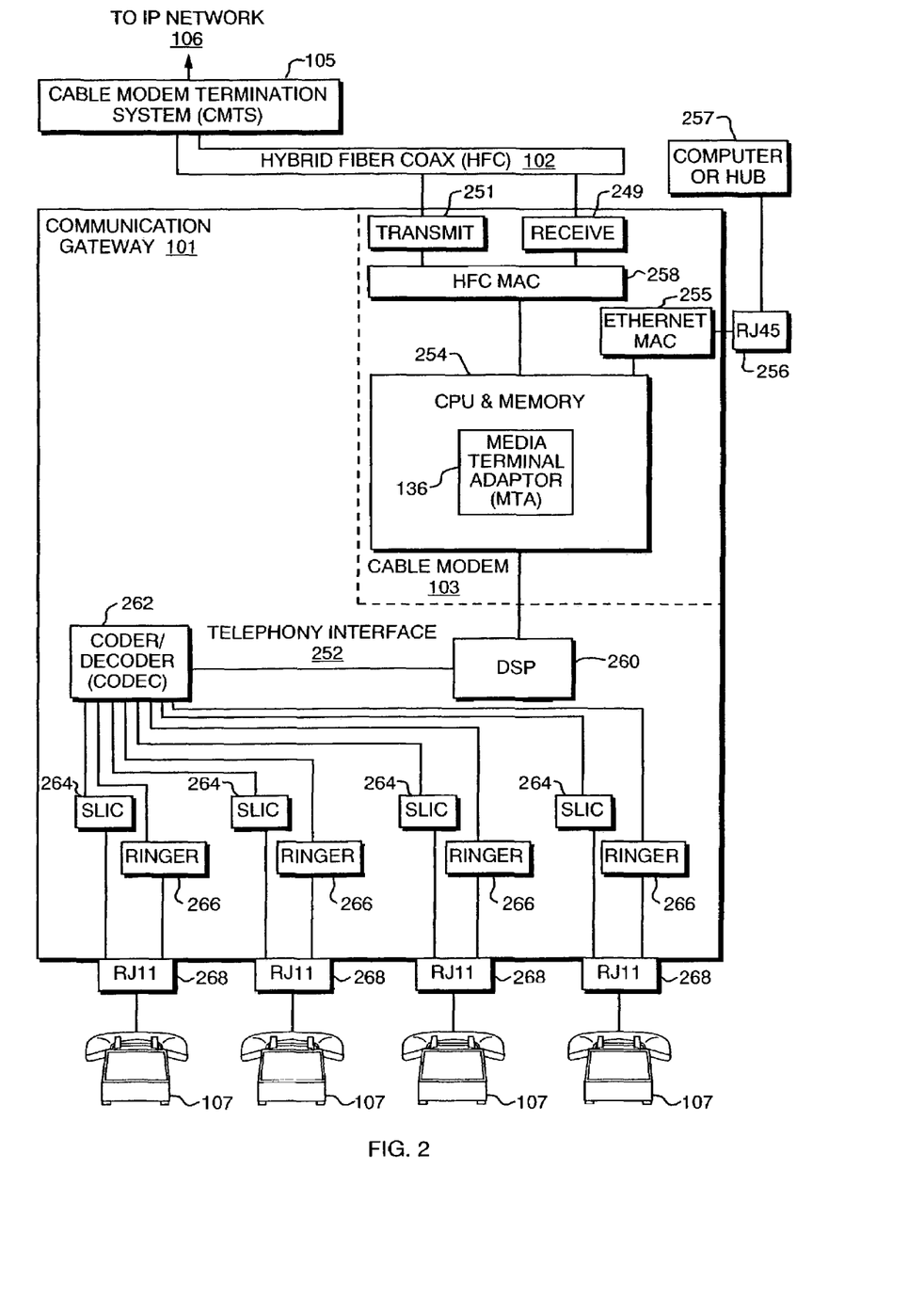
FIG. 2 is a block diagram of one embodiment of the communications gateway (CG) as shown in FIG. 1.

The HFC 102 allows for the cable modem 103 to communicate via the CMTS 105 over the IP network 106. This disclosure describes the interaction between one embodiment of CG 101, as shown in FIG. 2, and other portions of the VoIP system 100. The HFC 102 allows for data and IP voice to share the bandwidth with television channels. The CG 101 includes one or a plurality of telephone end points to which the subscriber telephones 101 connects. The CMTS 105 can be configured to provide for data, cable TV and/or telephone applications.

One embodiment of HFC 102 uses the Data Over Cable Systems Interface Specification (DOCSIS) protocol. DOCSIS is a standard for the cable modem interface over the HFC 102 between a cable TV operator and a computer or subscriber telephone. DOCSIS has been accepted as a standard since DOCSIS 1.0 when it was ratified by the International Telecommunication Union (ITU in March of 1998. Cable modems conforming to DOCSIS are commercially available from a variety of vendors.

Different embodiments of telephone service use the VoIP system 100. One embodiment of VoIP service is referred to as "on-net calls," in which each one of the multiple subscriber telephones is respectively connected via respective CGs 101 and communicates using either the IP network 106 and/or the HFC 102. Another embodiment of VoIP telephone service is referred to as "off-net calls" in which a CG 101 communicates with the remote CG 118 over a hybrid network system including, e.g., the LEC circuit switched network 116 and the IP network 106. Off-net calls involve not only the IP network 106 and the HFC 102 as do on-net calls, but also involve a LEC circuit switched network 116, a trunking gateway 110, and a signaling gateway 112 as shown in FIG. 1.

The call agent 108 initiates and terminates the calls in the IP network 106. There are typically a plurality of call agents 108 connected to the IP network 106; a different service provider may operate each call agent. Each call agent 108 may use a different call control language, such as Network Control System (NCS), Simple Gateway Control Protocol (SGCP), Multimedia Gateway Control Protocol (MGCP), GR303, and others. The call agent acts as a master of set-up and teardown for VoIP voice communications.

The embodiment of call agent 108 shown in FIG. 1 is physically structured as a computer, and includes the hardware to provide the necessary signals to initiate, monitor, regulate, and terminate VoIP communication. Each call agent 108 maintains the call state, performs phone number to IP address translations, and implements class features. One embodiment of the call agent 108 is fashioned as a server that runs an operating system such as a UNIX or WINDOWS NT® (A registered trademark of Microsoft Corporation of Redmond, Wash.). The call agent 108 may be configured as a server, a stand-alone computer, a PC, or any type of computer having adequate processing, memory and I/O capabilities. The call agent 108 includes a programmable central processing unit (CPU) 141 that is operable with a memory 142 (e.g., RAM, ROM, hard disk and/or removable storage) and well-known support circuits 143 such as power supplies, clocks, cache, and the like.

Additionally, the call agent 108 includes I/O circuits 144 that produce signals, such as a control output signal, a receive signals such as an input signal. By executing software stored in the memory 142, the call agent 108 interfaces with the CGs 101 and the subscriber telephones 107 that leads to call set-up, call termination, voice transmission, and other features that provide for telephone communication over the VoIP system and/or other telephony systems.

The media terminal adapter (MTA) 136 acts under the control of the call agent 108 and is integrated in the cable modem 103 or CGs 101. One embodiment of the MTA is configured as a microprocessor. The MTA 136 is controlled by the respective call agent 108 to monitor events occurring at the subscriber telephone 107, and report certain events (e.g., an off-hook condition). The MTA 136 sets up and tears down real time protocol (RTP) streams as commanded. Each call agent 108 operates independently to command its respective MTA 136 to monitor VoIP events, establish signal tones, and set up or tear down RTP voice streams.

If, however, an off-net call is being made, then VoIP system 100 has to establish communications to a Local Exchange Carrier (LEC) circuit switched network 116 as well as the IP network 106. Central offices included in the LEC circuit switched network 116 are used to set-up and break down the calls in the LEC circuit switched network 116 portion of the VoIP system. The communications between the IP network 106 and the LEC circuit switched network 116 can be categorized into signal and voice communication portions. The signal communications establish and break down channels by which the voice communications are transmitted. In one embodiment of off-net calls, the signal and the voice packets follow different routes (e.g. over the retrunking gateway 110 and the signaling gateway 112) between the IP network 106 and the LEC circuit switched network 116.

The trunking gateway 110 shown in FIG. 1, provides for voice communication interconnection between those portions of the VoIP system 100 that use the IP network (and communicate using the RTP protocol) and those portions of the VoIP system that use the LEC circuit switched network 116 (and use the phase code modulation (PCM) protocol). The trunking gateway 110 converts voice packets between the RTP packets used in the IP network 106 and the phase code modulation (PCM) packets used in the LEC circuit switched network 116. The trunking gateway 110 also sets up, maintains, and tears down voice steams provided between the IP network and the LEC circuit switched network 116.

The trunking gateway 110 thus has to provide for a mapping between those portions of the network that use the RTP protocol from those portions of the network that use the PCM protocol. The trunking gateway 110 therefore acts as a slave to either the call agent 108 in IP network 106 or the central office (not shown) in the LEC circuit switched network. The trunking gateway 110 also monitors the RTP packets in RTP streams transmitted between the IP network 106 and the LEC circuit switched network 116.

FIG. 2 shows one embodiment of CG 101 as shown in FIG. 1. The CG includes the cable modem portion 103 and a telephony interface portion 252. The cable modem portion includes a receiver 249, a transmitter 251, and an operatively shared portion of a CPU/memory unit 254. The cable modem portion 103 is configured to provide IP network data communications, e.g., via an Ethernet media access control (MAC) 255 and a high speed data port RJ45 (Ethernet) computer connector 256, to a computer or hub 257 or via one or more RJ11 connectors to one or more subscriber telephones 107.

The cable modem portion 103 also includes an HFC media access control (HFC MAC) 258 that provides OSI layer 2 interface between the HFC 102 and the CPU/memory unit 254 that includes combined CPU, memory, and associated circuits and input/output that operates generally as a controller. An Ethernet MAC 255 provides an interface between a computer or hub 257 and the CPU/memory unit 254. The telephony interface portion 252 is configured to provide IP network voice communications to, e.g., one or more subscriber telephones 107. The CPU/memory unit 254 controls and manages the processes occurring within CG 101 by data transfer and data storage between the components of the CG.

In one embodiment, the cable modem portion 103 may include a chip that integrates many of the above components. For example, Broadcomm Corporation of Irvine, Calif. produces one commercially available cable modem chip as the BCM3350 that combines the integrated 64/256-Quadrature Amplitude Modulation (QAM) receiver 249, a Quadrature Phase Shift Keying (QPSK)/16-Quadrature Amplitude Modulation (QAM) transmitter 251, a complete DOCSIS HFC media access control (MAC) 258, the CPU/memory unit 254 including, e.g., a MIPS32 CPU and a memory.

The receiver 249 directly samples a tuner output using an integrated pin grid array (PGA) package and an analog to digital (A/D) converter, and digitally resamples and demodulates the signal using recovered clock and carrier timing, filters, and equalizes the data. The soft decisions resulting from the sampling are passed to a compatible decoder. The final received data stream from receiver 249 is delivered in MPEG-w transfer format. All gain, clock, and carrier acquisition and tracking loops are integrated in the receiver. The transmitter 251 takes burst or continuous data, provides encoding and pre-equalization for the DOCSIS application, filters, and modulates the data stream, and provides a direct analog output to the HFC.

The telephony interface portion 252 includes a digital signal processor (DSP) 260, a coder/decoder (CODEC) 262, a plurality of subscriber line interface channels (SLIC) 264, a plurality of ringers 266, a plurality of RJ11 telephone jacks 268, and a shared portion of the CPU/memory unit 254. One subscriber telephone 107 may fit within each one of the plurality of RJ11 telephone jacks 268. The ringer 266 produces a ring in a prescribed subscriber telephone 107 when called from another subscriber telephone 107. The functionality of the ringer 266 may be integrated into the SLIC 264, for each respective phone line, resulting in a commercially available ringing SLIC.

The DSP 260 performs such voice protocol processing as compression, decompression, dial tone generation, Dual Tone Multi-Frequency (DTMF) tone detection, echo cancellation, etc. The DSP generates phase code modulation (PCM) signals what are sent to the CODEC 262. The DSP 260 also processes received PCM signals originating from the subscriber telephone 107 via the CODEC 262, and transfers the processed signal to the cable modem portion 103. The DSP is commercially available from such companies as Motorola, Incorporated of Schaumburg, Ill. and Texas Instruments of Dallas, Tex.

The digital interface between the DSP 260 and the CODEC 262 uses pulse code modulation (PCM). The CODEC 262 receives digital information from the DSP 260 in the form of a bit-stream where, in one embodiment, the amplitude of the incoming signal is related to the digital value (e.g., a digital 0 or 1) being sent. The CODEC 262 processes the PCM signals from the DSP 260, and generates an analog signal that is transmitted to the appropriate SLICs. In signals originating at the subscriber telephone, the CODEC 262 samples the signal from the SLIC 264 and translates the discrete amplitude into a digital number that is sent to the DSP, thereby translating the audio signals received from the SLIC into phase code modulated (PCM) signals that can be transferred to the DSP. The CODEC 262 transmits data to, and receives data from, the DSP utilizing the CODEC pins. The frame sync signals determine the frame's start position and the channel data that will be transmitted.

One SLIC 264 acts to connect the CG 101 with one subscriber telephone 107. The appropriate SLIC 264 translates the analog signals received from the CODEC 262 into voice signals (voltage levels) that can be converted by the subscriber telephone into voices or audible noises. The SLIC 264 also transfers audio signals from the microphone of the subscriber telephone 107 to analog signals that are received, and processed by, the CODEC. The SLIC 264 provides an interface between the RJ11 telephone jack 268 and the CODEC 262 and interfaces with the CPU/memory unit 254 by sending an interrupt to the CPU/memory unit 254, when necessary. The SLIC uses the interrupt to inform the CPU/memory unit 254 of the occurrence of events at the subscriber telephone. The SLIC 264 also contains circuits for loop-back testing that are used to test the operation of the subscriber telephone 107. The functions of the SLIC 264 includes limit is configured to echoes produced as signals encounter conductor discontinuities by flowing through portions of the CG 101.

The memory of the CPU/memory unit 254 may include RAM or ROM portions. More particularly, the memory of the CPU/memory unit 254 includes a dynamic RAM (DRAM) that is configured to perform a variety of operations. Certain operations stored and accessed in the memory of the CPU/memory unit 254 include the media terminal adapter (MTA) 136. The MTA interfaces with the call agent in a manner that allows the call agent to control the call set up, call maintenance, and call tear down by the call agent.

Figure 3:
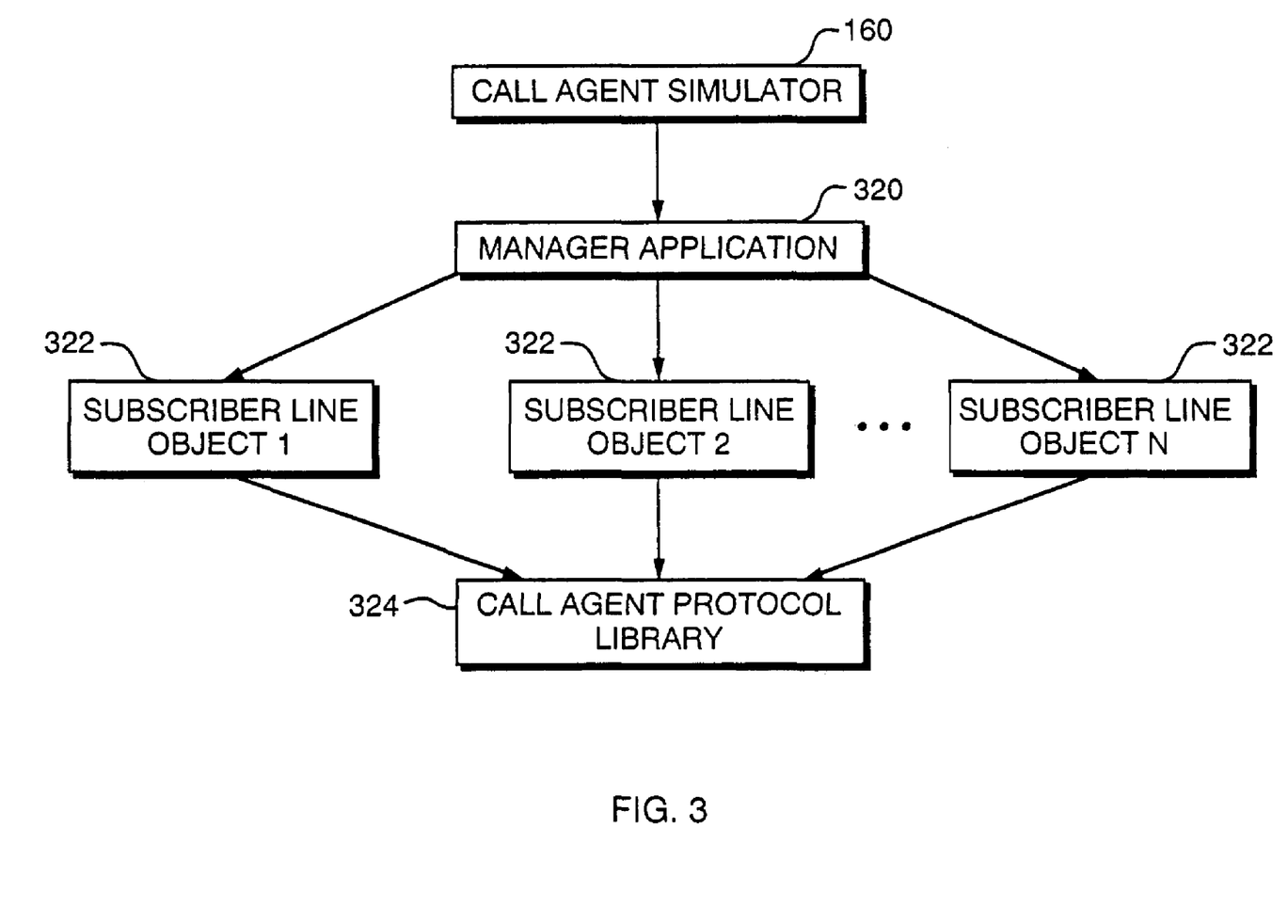
FIG. 3 shows a logic flow diagram of one embodiment of the call agent simulator shown in FIG. 1.

FIG. 3 shows one embodiment of the call agent simulator 160. Each call agent simulator 160 includes a manager application 320, a plurality of subscriber line objects 322, and a call agent protocol library 324. A preferred embodiment of the manager application is provided in the PERL programming language. The PERL language has an advantage in being a runtime interpretive language. As such, PERL avoids the necessity of undergoing compiling, linking, or loading as is the case with other programming languages with which call agents and call agent simulators are programmed.

Figure 4:
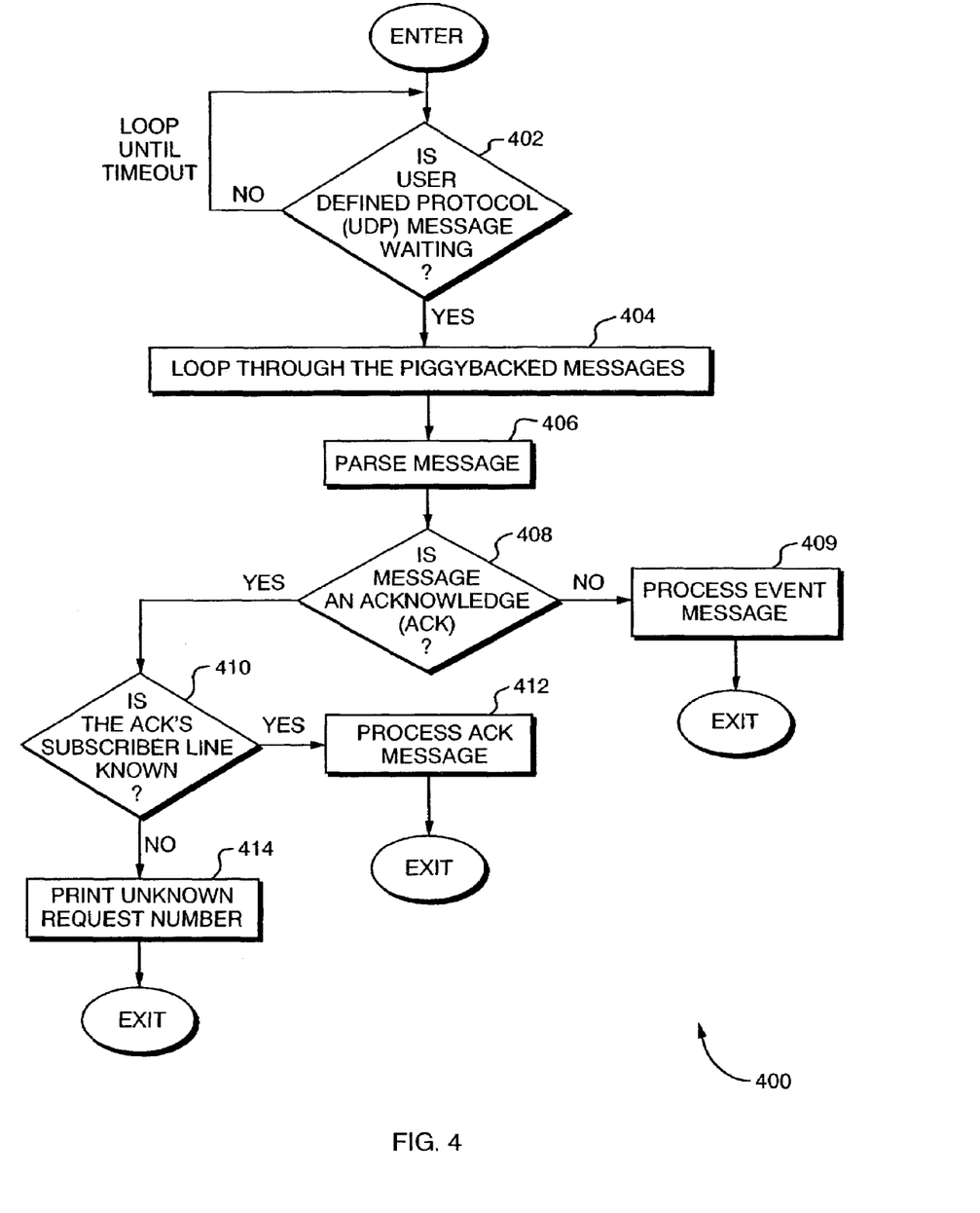
FIG. 4 shows a flow chart of one embodiment of manager application of the call agent simulator shown in FIG. 1.

The manager application 320 suitably coordinates the subscriber objects when making phone calls using the VoIP system. As such, only certain calls will be made to or from the local CG 101 using the VoIP technology. FIG. 4 shows one embodiment of method 400 to perform the manager application 320, envisioned to be programmed in the PERL language. The PERL language is used for several reasons including the fact that it is easy to manage and modify. It is therefore not necessary to spend considerable time to provide slight functionality or user modifications that result from adding a couple of lines to the existing code. Additionally, PERL simplifies adding desired code extensions to add new functionality and without spending a lot of time.

The method 400, that uses PERL, starts with decision step 402 in which it is determined whether there is a UDP message waiting. If the answer to decision step 402 is no, then the method 400 loops through decision step 402 for a prescribed duration until a time out. If the answer to decision step 402 is yes, then method 400 continues to step 404 in which the manager application 320 loops through the piggybacked messages. One embodiment of the PERL code used in step 404 is:

my @allMessages=CallAgent::GetPiggybackNessages($receivedMsg); foreach $_(@allMessages)

The method 400 continues to step 406 in which the message is parsed. Following the parsing of the message, method 400 continues to decision step 408 in which the manager application determines whether the message is an acknowledgement (ACK). If the answer to decision step 408 is no, then method 400 continues to step 409 in which the event message is processed. Following step 409, the message terminates. If the answer to decision step 408 is yes, then the method 400 continues to decision step 410 in which it is determined whether the subscriber line objects 322 of the ACK is known. If the answer to decision step 410 is yes, then the method 400 continues to step 412. In step 409, the ACK message is processed; then the method is terminated. If the answer to the decision step 410 is no, then the method 400 continues to step 414 in which the manager application prints that there is an unknown request number. Following step 414, method 400 terminates.

Each one of the plurality of subscriber line objects 322 encapsulates the call agent functions for each of the local CG 101. The manager application uses PERL programming language terms that are more functionally intuitive than the prescribed NCS terms that are stored in the call agent protocol library.

TABLE 2 shows one embodiment of subscriber line object 322 programmed in the PERL programming language. The subscriber line object code contains a series of routines corresponding to the messages that the call agent simulator (and the call agent) are likely to encounter. The possible routines are arranged so an executing subscriber line encounters the routines in series using the "elseif" PERL command. Examples of the messages included in the subscriber line object include, but are not necessarily limited to, notify (NTFY), off-hook condition, on-hook condition, hook flash, digits detected, acknowledgement (ACK), sending out RQNT to get digits from a subscriber telephone 107, and send out busy tone from a subscriber telephone. Samples of three PERL code portions (an off hook message, a digits detected message, and a collect digits message, are shown in TABLE 1, TABLE 2, and TABLE 3, respectively.

TABLE 1

Off Hook PERL Pseudecode for Subscriber Line Object

```
# The line is off hook
    #
    $self->{hookState} = "off";
    # Send back an off hook command and send out a RQNT to get out
of
    # quarantine state
    #
    $action{command} = "OFF HOOK";
$self->BtiSendRqnt( "hu" . GetBtiAdditionalOption('tones'), "", "");
```

TABLE 2

Digits Detected PERL Pseudecode for Subscriber Line Object

```
    # Digits were detected
        # collect all the digits in the notify line
        #
        while ($message{events} =~s/(\d)//)
        {
            $self->{digits} .=$1;
        }
```

TABLE 3

Collect Digits PERL Pseudecode for Subscriber Line Object

```
# Sends out an RQNT to collect digits.
# Based on options either a digit map is uses or digits are collected
# one at a time.

sub GetDigits
{
    my ($self) = @_;
    $self->{digits}= "";
    if ($options{useDigitMap})
    {
        # build the digit map based on the one based flag.
        #
        my $digitMap = "(";
        if ($options{oneBased})
        {
            $digitMap .= "1|2|3|4|";
        }
        else
        {
            $digitMap .= "0|1|2|3|";
        }
        $digitMap .= "666XXXX|777XXXX|888XXXX|999XXXX)";
        # Send it out
        #
        $self->BtiSendRqnt("hu, [0–9#*](d)", $digitMap, "dl");
    }
    else
    {
        # Send out single digit collection.
        #
        $self->BtiSendRqnt("hu, [0–9#*t](n)", "X", "dl");
    }
}
```

The call agent protocol library 324 in the embodiment shown in FIG. 3 is arranged to format messages, e.g., using Network Control System (NCS), Simple Gateway Control Protocol (SGCP), Multimedia Gateway Control Protocol (MGCP), GR303, or any other suitable call control language. The call agent protocol library 324 includes a translation, i.e. mapping, portion that provides a translation for the NCS term for the functions. The NCS terms are standardized, so that the standardized NCS terms can be mapped against desired PERL terms. The NCS term is commonly used and recognized by the call agents 108 that interface with such network components as the subscriber telephones 107. One embodiment of the translation portion of the call agent protocol library is shown in TABLE 4. The call agent simulator thereby transmits the NCS term corresponding to the PERL message, over the IP network and/or the HFC, to the desired network component.

TABLE 4

Translation Portion Pseudocode of Call Agent Protocol Library

```
$trans = "" if! defined($trans);
    $notify = "" if! defined($notify);
    $message =
    "DLCX $requestNumber aaln/$line\@$btiName $version\n";
    $message .= "C:$connectId\n" if $connectId;
    $message .= "I:$btiConnectId\n" if $btiConnectId;
    $message .= "S:$signal\n" if $signal;
    $message .= "X:$trans\n" if $trans;
    $message .= "R:$notify\n" if $notify;
```

One embodiment of PERL pseudocode that can be used to process an event message is shown in TABLE 5.

TABLE 5

PERL Psendocode to Process Event Message

```
$self->BtiSendAck(200, $message{requestNumber}, "Ok");
if ($message{events} =~/hd/i)
{
    #The line is off hook
    #
    $self->{hookState} "off";
    # Send back an off hook command and send out a RQNT
    to get out of
    # quarantine state
    #
    $action{command} "OFF HOOK";
    $self->BtiSendRqnt("hu" GetBtiAdditionalOption('tones'), "","");
}
elsif ($message{events} =~/hu/i)
{
    # The line is on hook
    #
    $self->{hookState} = "on";
    # Send back an on hook command and send out a RQNT
    to get out of
    # quarantine state
    #
    $action{command} = "ON HOOK";
    $self->BtiSendRqnt("hd", "", "");
}
elsif ($message{events} =~ /hf/i)
{
    # hook flash occured
    # Send back the flash hook command and send out a RQNT
    to get out
    # of quarantine state
    #
    $action (command) = "HOOK FLASH";
    $self->BtiSendRqnt("hu", "", "");
}
```

TABLE 6 shows a PERL code snippet a code agent simulator could use to process an ACK message.

TABLE 6

PERL Pseudocode to Process ACK Message

```
# this is a ACK message

if($message{requestNumber} == $self->{createRequest1})
{
    # This is an ack to create request 1
    #
    if ($message{error} eq "200")
    {
        # save the connect ID and RTP information.
        #
        $self->{btiConnectId1} = $message{connectId};
        if($message{rtp})
        {
            $self->{rtp1} = $message{rtp};
        }
        # return connected command with RTP information
        #
        $action{command} "CONNECTED";
        $action{rtp}    = $self->{rtp1};
    }
    else
    {
        $action{command} = "CONNECT FAILED";
    }
}
elsif ($message{requestNumber} == $self->{modifyRequest1})
{
    # This is an ack to modify request 1
    #
    if ($message {error} eq "200")
    {
```

TABLE 6-continued

PERL Pseudocode to Process ACK Message

```
    #save RTP information.
    #
    if ($message{rtp})
    {
        $self->{rtp1} =$message{rtp};
    }
    # return modified command with RTP information
    #
    $action {command} "MODIFIED";
    $action {rtp}    = $self->{rtp1};
    }
    else
    {
        $action{command} = "MODIFY FAILED";
    }
}
```

It is envisioned that the call agent simulator could be adapted to validate or test calls between the VoIP systems and other networks. A suitable interface would have to be provided to test the operation of the CGs and other components. Though the call simulator is presently configured to allow for relatively simple programming (by using the PERL programming language), the call simulator can be modified and presumably made more complex, to provide some other capabilities including the ability to interface with different networks, and the ability to respond to different events. For example, the call agent simulator can simulate call waiting, call following, and other such functionality over a wide variety of telephony systems depending upon the set-up of the call agent simulator.

One embodiment of the utilization of the call agent simulator 160 provides for testing and verification of the IP network 106, CG 101, the call agent, or other portions of the VoIP system 100. One method for testing and verifying the operation of the VoIP system includes initially connecting the call agent simulator to the network. Call actions or events as applied from the call agent simulator 160 to the network, are expected to produce certain results in the IP network. The actual results produced in the network are compared and verified relative to the expected results.

Following the testing or verification of the network, the network components, or the call agent, the call agent simulator 160 may be operationally replaced by the call agent 108. Such replacement may occur, as shown in FIG. 1, by initially disconnecting the call agent simulator 160 from the network. A call agent, whose programmed features are consistent with the call agent simulator, is then connected to the network.

An active call agent simulator 160 directs the VoIP system, the CG equipment, and the associated equipment in the network in the process of making phone calls. For example, if a user goes off line, the subscriber telephone provides a dial tone indicating that the phone can be successfully dialed. The call agent simulator 160, as programmed in PERL, in fact can be programmed to do all of the call establishment, call maintenance, and call breakdown functions normally associated with the call agent. The call agent simulator 160 is designed to be easy to test network components and systems by sacrificing some of the features associated with a traditional call agent such as billing capability. The call agent simulator 160 consequently doesn't have the internal complexity of the call agent, but is relatively simple to program and operate. In this manner, new functionality that is being added to the call agent can initially be tested in the call agent simulator before the expense, time and processing requirements associated with operating the call agent. This is largely due to the fact that the call agent simulator is programmed in a run-time interpretive language such as PERL, and excludes some of the functions normally associated with a call agent, such as billing.

In addition, the call agent simulator 160 provides for network testing and validation. The call agent simulator 160 can be programmed with the basic operational functionality associated with the call agent. The call agent simulator 160 is then used to test how the IP network and the HFC interfaces with the VoIP system. If the call agent simulator 160 indicates that the VoIP system is operating satisfactorily, then the call agent simulator is disconnected and replaced by a call agent having a similar PERL code. The call agent simulator allows for accurate and important validation of a network before an actual call agent is used. As such, the equipment can be validated more easily because the programming of the call agent simulator 160 is less complex to program than that of the call agent itself (which additionally requires compiling and linking).

While the principles of the invention have been described above in connection with the specific apparatus and associated method, it is to be clearly understood that this description is made only by way of example and not as a limitation on the scope of the invention.

What is claimed is:

1. A method for testing telephone operation, the method comprising:
    connecting a call agent simulator to a Voice over Internet (VoIP) network, the call agent simulator being configured to simulate a plurality of call actions using a runtime interpretive programming language without compiling, each call action having an associated expected result in the network;
    applying at least one call action of the plurality of call actions from the call agent simulator to the network;
    detecting actual results in the network in response to the at least one call action; and
    verifying the actual results produced compared to the expected results.

2. The method set forth in claim 1, further comprising: disconnecting the call agent simulator from the network; and connecting a call agent whose features are similar to the call agent simulator to the network.

3. The method of claim 1, wherein the call agent simulator includes a plurality of functions performed over the network.

4. The method of claim 3, further comprising extending the number of the functions.

5. The method of claim 1, wherein the call agent simulator uses PERL language.

6. The method of claim 1, wherein the step of verifying the actual results is performed by the call agent simulator without linking of the call agent simulator.

7. The method of claim 1, wherein the expected results occur in the network.

8. The method of claim 1, wherein the expected results occur in a communications gateway (CG) connected to the network.

9. An apparatus for testing Voice over Internet (VoIP) operations over a network, the apparatus comprising:
    a call agent simulator attached to the network, the call agent simulator being configured to simulate a plurality of call actions using a runtime interpretive programming language without compiling, each call action having an associated expected result in the network; the call agent simulator applying at least one call action of the plurality of call actions to the network; and the call agent being configured to verify the actual results produced in the network relative to the expected results.

10. The apparatus of claim 9, wherein the call agent simulator further comprises:
    a manager level application;
    a line object for each phone line supported by the call agent, each line object includes the attributes for that phone line; and
    a call agent protocol library that is used by each line object to set up attributes.

11. The apparatus of claim 10, wherein the manager level application is used to set up each line object.

12. The apparatus of claim 10, wherein the manager level application dynamically add new line objects.

13. The apparatus of claim 10, wherein the manager level application coordinates the line objects when making phone calls.

14. The apparatus of claim 10, wherein the line objects encapsulate call agent functions when making phone calls.

* * * * *